United States Patent
Verma et al.

(10) Patent No.: US 6,725,044 B2
(45) Date of Patent: Apr. 20, 2004

(54) TECHNIQUE SEAMLESS HANDOFF OF A MOBILE TERMINAL USER FROM A WIRELESS TELEPHONY NETWORK TO A WIRELESS LAN

(75) Inventors: Shaily Verma, Monmouth Junction, NJ (US); Guillaume Bichot, Princeton, NJ (US)

(73) Assignee: Thomson Licensing S.A., Boulogne (FR)

( * ) Notice: Subject to any disclaimer, the term of this patent is extended or adjusted under 35 U.S.C. 154(b) by 15 days.

(21) Appl. No.: 10/219,579

(22) Filed: Aug. 15, 2002

(65) Prior Publication Data

US 2004/0033805 A1 Feb. 19, 2004

(51) Int. Cl.[7] ................................................. H04Q 7/20
(52) U.S. Cl. .......................... 455/444; 455/437; 370/331
(58) Field of Search .................................. 455/437, 438, 455/436, 432.1, 444, 426.1; 370/331, 332

(56) References Cited

U.S. PATENT DOCUMENTS

| | | | |
|---|---|---|---|
| 4,706,275 A | | 11/1987 | Kamil ........................... 379/144 |
| 5,379,447 A | * | 1/1995 | Bonta et al. ................. 455/437 |
| 5,444,766 A | * | 8/1995 | Farwell et al. .............. 455/437 |
| 5,530,693 A | * | 6/1996 | Averbuch et al. ........... 455/437 |
| 5,732,359 A | * | 3/1998 | Baranowsky et al. ..... 455/552.1 |
| 5,839,070 A | * | 11/1998 | Lupien et al. ............... 455/440 |
| 6,061,565 A | * | 5/2000 | Innes et al. ................. 455/436 |
| 6,122,511 A | * | 9/2000 | Ozluturk ..................... 455/437 |
| 6,466,556 B1 | * | 10/2002 | Boudreaux .................. 370/331 |
| 6,466,790 B2 | * | 10/2002 | Haumont et al. ........... 455/437 |
| 2002/0064144 A1 | * | 5/2002 | Einola et al. ................ 370/335 |
| 2003/0114158 A1 | * | 6/2003 | Soderbacka et al. ........ 455/436 |
| 2003/0125028 A1 | * | 7/2003 | Reynolds ..................... 455/437 |

FOREIGN PATENT DOCUMENTS

| | | | | |
|---|---|---|---|---|
| EP | 1 178 644 A2 | 2/2002 | ........... | H04L/29/06 |
| WO | WO 00/69113 | 11/2000 | ........... | H04L/9/08 |
| WO | WO 01/54379 A1 | 7/2001 | ........... | H04L/29/06 |
| WO | WO 01/76134 A1 | 10/2001 | ............. | H04L/9/32 |
| WO | WO 02/05520 A2 | 1/2002 | | |

OTHER PUBLICATIONS

Sophia Antipolia; *3GPP TS 23.101 V.4.0.0 (Apr. 2001)*, Valbonne–France,.
Unitech; *Unitech Solutions Introducing Unitech Subscriber Solutions (May 17, 2002)* USA.
Bizwatch; *GRIC Offers Prepaid Wireless Service to Network and Corporate Customers Through Mind CTI* (Oct. 29, 2001) USA.

* cited by examiner

Primary Examiner—William Trost
Assistant Examiner—Sharad Rampuria
(74) Attorney, Agent, or Firm—Joseph S. Tripoli; Harvey D. Fried; Robert B. Levy

(57) ABSTRACT

A mobile terminal user (16) can trigger a handoff from a first radio access node (18) to a second radio access node (30) in a communications network by making such a request to one of the two nodes. The request made by the mobile terminal user (16) will trigger in the network (10) a command to relocate (handoff) the mobile terminal user. In response to the command, the mobile terminal user is assigned to the second radio access node (30) and is released from the first radio access node (18).

15 Claims, 2 Drawing Sheets

TECHNIQUE SEAMLESS HANDOFF OF A MOBILE TERMINAL USER FROM A WIRELESS TELEPHONY NETWORK TO A WIRELESS LAN

TECHNICAL FIELD

This invention relates to a technique for enabling a mobile terminal user to force a seamless handoff from a wireless telephony network to a wireless Local Area Network (LAN) interworked with the wireless telephony network.

BACKGROUND ART

Advances in the field of wireless LAN technology has led to the availability of relatively inexpensive wireless LAN equipment, which, in turn, has resulted in the emergence of publicly accessible wireless LANs (e.g., "hot spots") at rest stops, cafes, libraries, and similar public facilities. Presently, wireless LANs offer users the opportunity to access private data networks, such as Corporate Intranets, and a public data networks such as the Internet. Few if any publicly accessible wireless LANs currently offers any type of telephone service, let alone, wireless telephony service.

Presently, users desirous of obtaining wireless telephony service typically subscribe to one of many providers of such service. Today's wireless telephony service providers not only offer voice-calling capability, but also offer General Packet Radio Service (GPRS), thereby affording subscribers the capability of exchanging data packets via a mobile terminal. While GPRS exists in many areas, data transmission rates typically do not exceed 56 Kbs and the costs incurred by wireless network service providers to support this service remain high, making GPRS expensive.

The relatively low cost to implement and operate a wireless LAN, as well as the available high bandwidth (usually in excess of 10 Megabits/second) makes the wireless LAN an ideal access mechanism through which a mobile terminal user can exchange packets with a wireless telephony network. The advantages of higher bandwidth and lower access charges make the wireless LAN a more attractive access network than the wireless telephony network itself. Indeed, given a choice, most mobile terminal users would prefer to receive data communications service via a wireless LAN rather than directly from the wireless telephony network Often, the coverage area available for a given wireless LAN will overlap the coverage area of a wireless telephony area with which the wireless LAN is interworked. Under such circumstances, the mobile terminal could receive access from either the wireless LAN or the wireless telephony network. Heretofore, effecting a seamless handoff of the mobile terminal user from the wireless telephony network to the wireless LAN has proven problematic. Presently, most wireless telephony networks effect handoff of a mobile terminal user from one cell to another in the network in accordance with the strength of signals exchanged with the mobile terminal user. The cell currently providing wireless telephony service constantly monitors the strength of signals exchanged with each mobile terminal user. Upon detecting a reduction in the received signal strength below a prescribed threshold, the cell initiates handoff of the mobile terminal user to an adjacent cell registering a higher received signal strength. As long as the current cell continues to register a received signal strength above the prescribed threshold, no handoff occurs. Thus, even if the mobile terminal user desires to receive service from a wireless LAN providing overlapping coverage, the user will continue to receive service from a cell in the wireless telephony network.

Thus, there is a need for a technique that enables a mobile terminal user to force a seamless handoff to a wireless LAN from a cell in the wireless telephony network.

BRIEF SUMMARY OF THE INVENTION

Briefly, in accordance with present principles, a method is provided for effecting a seamless handoff of a mobile terminal user in a communications network from a first radio access mechanism to a second radio access mechanism. In a preferred embodiment, the first Radio access mechanism comprises a Radio Network Controller controlling an associated radio access node (e.g., a "cell") in a wireless telephony network, while the second access mechanism comprises an Interworking Element that functions as a logical Radio Network Controller for controlling a radio access point in a wireless LAN. The method commences upon receipt of a request made by the mobile terminal user to receive service from the second radio access mechanism. Such a request triggers a command in the communications network to relocate (handoff) the mobile terminal, i.e., to redirect the data path away from the first radio access mechanism and through the second radio access mechanism. Responsive to the command, the second radio access mechanism is assigned to provide service to the mobile terminal user so that the user can commence a communications session and thereby exchange data packets with the network via the second radio access mechanism. Upon the assignment of the second radio access mechanism to the mobile terminal user, the first radio access mechanism is released so that the mobile terminal user no longer receives service therefrom.

DETAILED DESCRIPTION

Figure 1:
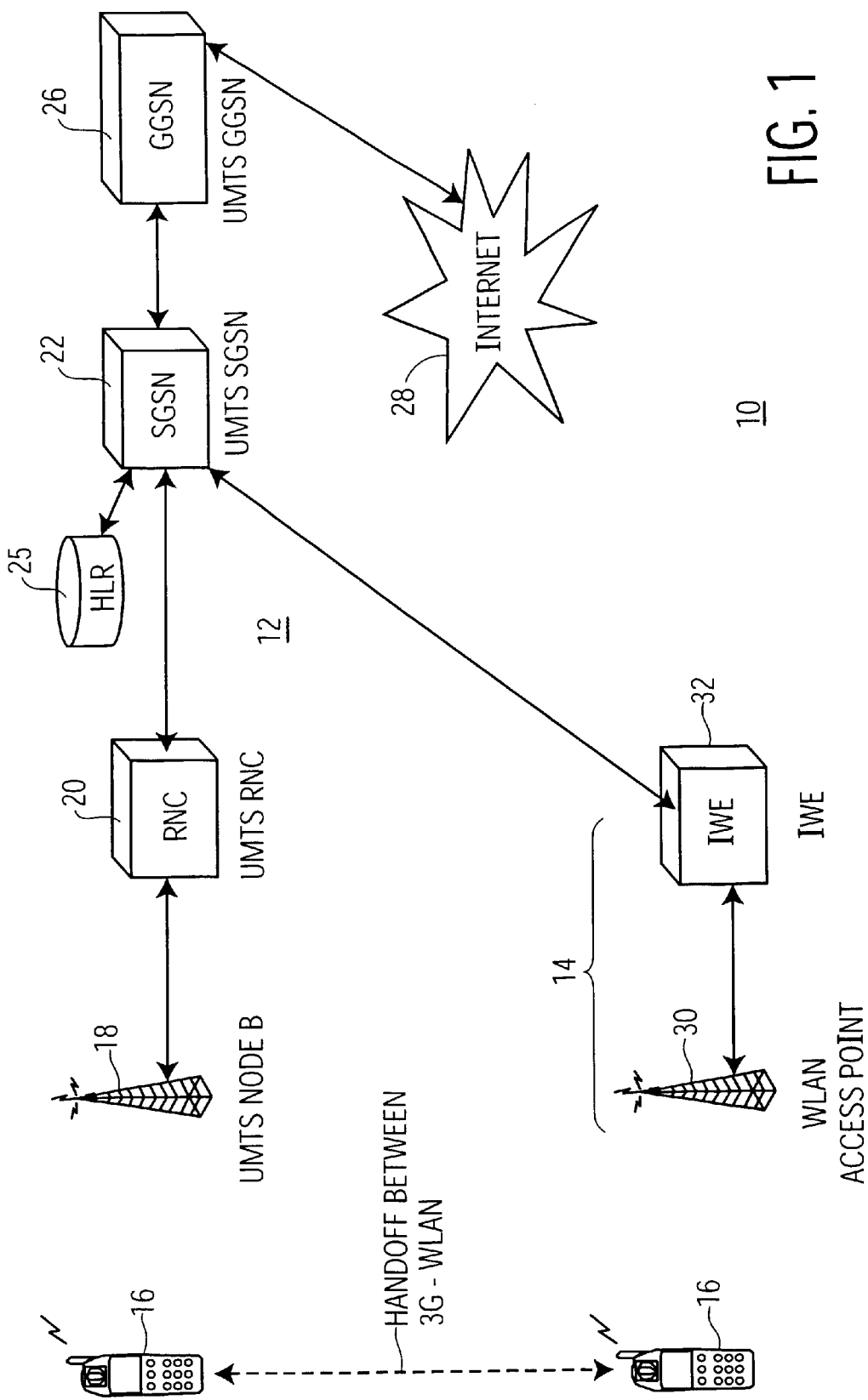
FIG. 1 depicts a block schematic diagram of a communications network for practicing the method of the present principles.

FIG. 1 depicts a block schematic of a communications network 10 that includes a wireless telephony network 12 interworked with a wireless LAN 14. In accordance with present principles, a mobile terminal user 16 can request to relocate (handoff) from the wireless telephony network 12 to the wireless LAN 14 in a seamless fashion.

In the illustrated embodiment, the wireless network 12 has an architecture in compliance with the UMTS 3GPP standard. To that end, the wireless telephony network 12 includes at least one radio access node 18 in the form of a Universal Mobile Telephone System (UMTS) Node B, for providing radio access within a particular geographic area to the mobile terminal user 16, as well as to other mobile terminal users (not shown). While FIG. 1 illustrates only one radio access node 18, the wireless telephony network 12 typically contains a plurality of such nodes managed by at least one Radio Network Controller (RNC) 20. Indeed, the wireless network 12 could include a plurality of RNCs, each RNC 20 managing a group of radio access nodes 18.

Within the wireless telephony network 12, each RNC, such as RNC 20, interfaces with an associated Serving GPRS Service Node (SGSN) 22. While FIG. 1 illustrates a single SGSN 22, the wireless telephony network 12 can include a plurality of SGSNs, each associated with one or more RNCs 20. Each SGSN, such as SGSN 22, identifies and authenticates each mobile terminal user, such as user 16, seeking service on a corresponding radio access node, such as radio access node 18. The SGSN 22 interfaces with a Home Location Register (HLR) 25. The HLR 25 takes the form of a database that stores information about each mobile terminal user, such as mobile terminal user 16, that subscribes to packet radio service, such as General Packet Radio Service (GPRS), provided by the wireless telephony network 12. In particular, the HLR 25 stores the IP address assigned to each mobile terminal user when the user attaches itself to the wireless network as well as the identity of the corresponding SGSN 22 currently serving that mobile terminal user.

A Gateway GPRS Support node (GGSN) 26 provides a path between the SGSN 22 and a public data network 28, such as the Internet. The GGSN 26 will reserve the necessary resources needed for providing a data path from the mobile terminal user 16 to the Internet 28 and to perform any needed authentication for Internet access. Moreover, upon initial attachment of the mobile terminal user 16 to the wireless telephony network 12, the GGSN 28 will assign the mobile terminal user 16 the dynamic IP address as part of a Packet Data Protocol (PDP) context initiated by the user during attachment.

Presently, once a data connection is established with the mobile terminal user 16 as part of the attachment process, the data path will go through the SGSN 22 and the RNC 20 currently serving the user. Hereinafter, the RNC 20 currently providing the data path will be referred to as the "serving" RNC or "SRNC". When the mobile terminal user 16 moves, the current SRNC 20 controls the relocation. In other words, the current SRNC 20 determines which RNC will serve the mobile terminal user 16 in the future. In this regard, the mobile terminal user 16 will periodically apprise the current SRNC 20 of the strength of the signal received from the current radio access 18 node as well as from neighboring radio access nodes (not shown in FIG. 1) attached to the SRNC as well as those nodes attached to other RNCs. At the same time, the radio access node 18 will monitor for the RNC 20 the strength of the signal received from the mobile terminal 16. Based on these measurements, the current SRNC 20 can change which RNC serves the mobile terminal user 16. Stated another way, the current SRNC 20 can change path through which data passes to the mobile terminal user 16.

Assuming the mobile terminal user 16 reports a higher received signal strength from a radio access node attached to a RNC different than the current SRNC 20, then the current SRNC 20 generates a command to the SGSN 22 to initiate the relocation. The command will contain the address of the new RNC 20 that will hereinafter act as the SRNC. In response to the command from the current SRNC 20, the SGSN 22 triggers the establishment of a new data path to the mobile terminal user 16. Such a new path includes: (a) a connection between the SGSN 22 and the new SRNC, (b) a connection between the new SRNC and its associated radio access node, and (c) a connection between new radio access node and the mobile terminal user 16. The SGSN 22 removes the old data path between the SGSN and the mobile terminal user 16 through the previous SRNC 20.

The present-day approach of effecting a handoff of a mobile terminal user 16 between the SRNC 20 and its associated radio access nodes 18 proves problematic when the mobile terminal user 16 seeks a handoff to the IWE 32 and its associated radio access point 30 in the wireless LAN 14. In many instances, the coverage area of the wireless telephony network 12 will overlap the coverage provided by the wireless LAN 14. In other words, the mobile terminal user 16 could remain in communications with SRNC 20 and its associated radio access node 18 in the wireless telephony network 12, while seeking access to the IWE 32 through its associated radio access point 30 in the wireless LAN 14. From the perspective of managing the exchange of packets with the mobile terminal user 16, only one radio access mechanism (i.e., only one of (a) the SRNC 20 and its associated radio access node 18 and (b) the IWE 32 and its associated the radio access point 30), should be assigned to the user.

With the present day handoff protocol, the mobile terminal user 16, once assigned to the SRNC 20 and its associated radio access node 18 in the wireless telephony network 12, will remain so assigned for as long as the received signal strength remains above the prescribed threshold. Thus, the mobile terminal user 16 remains assigned to the SRNC 20 and its associated radio access node 18 despite the user's access of the wireless LAN 14.

In accordance with present principles, the mobile terminal user 16, once having initiated access with the radio access point 30 of the wireless LAN 14, can force a handoff to the IWE 32, even though the user currently receives service from the SRNC 20 and associated radio access node 18 in the wireless telephony network 12. At least two ways exist whereby the mobile terminal user 16 can effect such a forced handoff. For example, the mobile terminal user 16 can effect a forced handoff through the wireless LAN 14 by signaling to the SGSN 22 that the mobile terminal user now resides within the coverage area of the wireless LAN. Alternatively, the mobile terminal user 16 can force a handoff through the wireless telephony network 12 by purposely manipulating the received signal strength reported to the wireless telephony network in such a way that the IWE 32, through its associated radio access point 30 in the wireless LAN 14, appears to provide the user with a greater received signal strength.

Wireless Lan 14 Forced Handoff

To effect a forced handoff via the wireless LAN 14, the mobile terminal user 16 initiates a routing area update in much the same way that the user would initiate such an update upon entering the coverage area of another mobile telephony network. The process of initiating a routing area update upon entering the coverage area of another mobile terminal network is well known. To that end, the mobile terminal user 16 typically utilizes the well-known GMM protocol (or a similar protocol) to communicate to the SGSN 22 an identifier that identifies the new geographic area from which the mobile terminal user 16 will hereinafter receive service. Thus, the SGSN 22 will know from the new identifier provided by the mobile terminal user 16 that the new geographic coverage area corresponds to the coverage area of the wireless LAN 14. Using this knowledge, the SGSN 22 updates its records and initiates an update of the HLR 25 as well to reflect that the mobile terminal user 16 now resides in the coverage area of the wireless LAN 14. In addition, the SGSN 22 signals the SRNC 20 managing the radio access node 18 currently in communication with the mobile terminal user 16 to cease providing such service.

Figure 2:
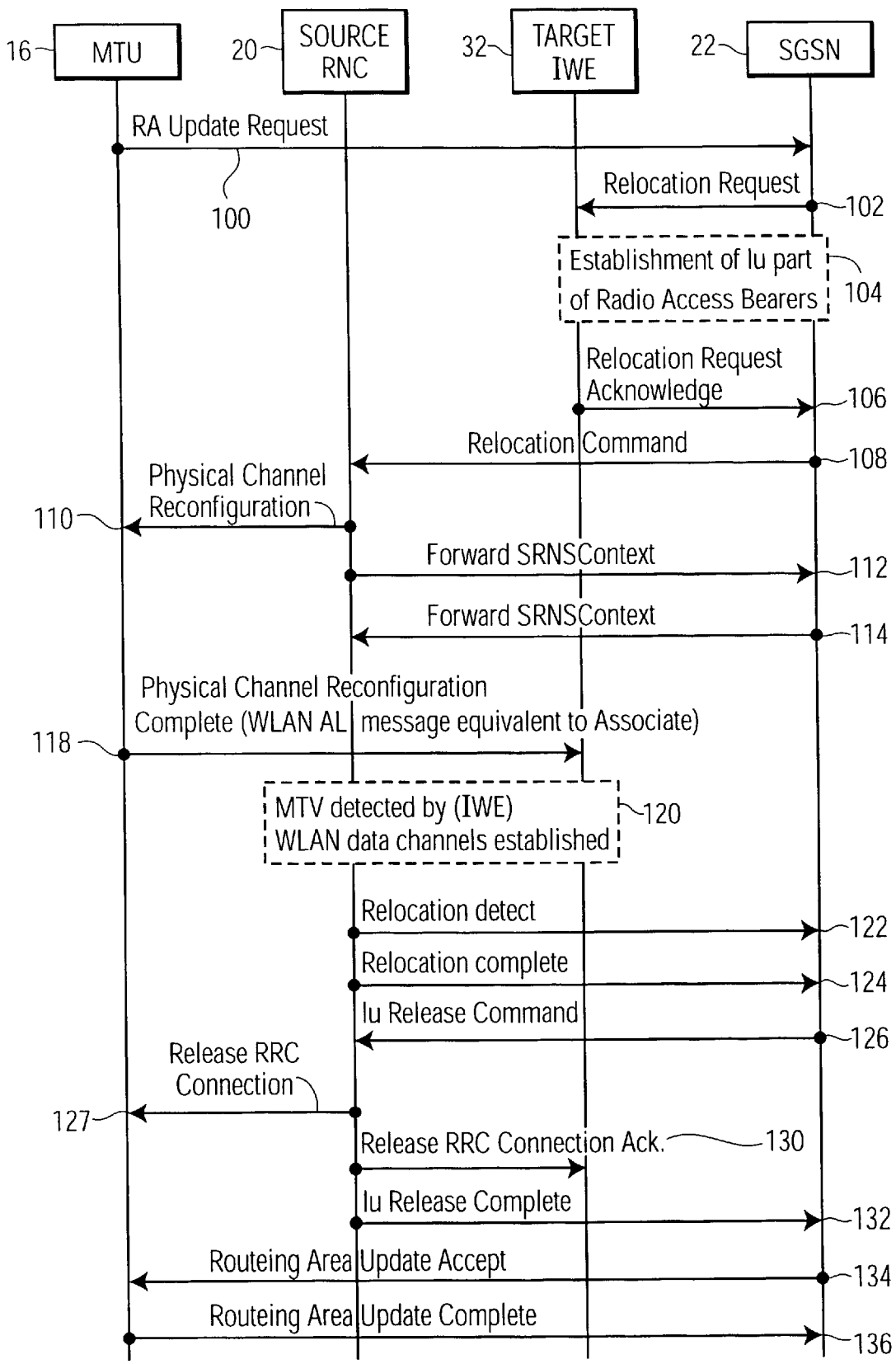
FIG. 2 depicts a ladder diagram illustrating the flow of signaling messages among elements of the network of FIG. 1 to effect handoff of a mobile terminal user from a first radio access mechanism to a second radio access mechanism in accordance with the method of the present principles.

FIG. 2 illustrates the specific sequence of steps associated with the process of effecting a forced handoff in response to a routing area update made by the mobile terminal user 16. The process commences when the mobile terminal user 16 makes a routing area (RA) update request (step 100) to the SGSN 22 through the SRNC 20 and its associated radio access node 18 of FIG. 1 after the user had initiated access of the wireless LAN 14. In response to the RA update request, the SGSN 22 triggers relocation of the mobile terminal user 16 from the SRNC 20 to the IWE 32 as the new SRNC in the same manner as a conventional relocation of the user from one SRNC to another. In this regard, the SGSN 22 first requests during step 102 that the Interworking Element (IWE) 32 of the wireless LAN 14, now acting as a "logical" RNC, commence providing service to the mobile terminal user 16. To accommodate the request made during step 102, the IWE 32 within the wireless LAN 14 undertakes the establishment of the Iu part (i.e., the interface function) of the well-known Radio Access Bearer protocol during step 104 to provide service to the mobile terminal user 16. Following step 104, the IWE 32 acknowledges the relocation request to the SGSN 22 during step 106.

Once the IWE 32 has commenced providing service to the mobile terminal user 16, the SGSN 22 sends a relocation command during step 108 to the SRNC 20 that had heretofore provided service to the mobile terminal user 16. In response to the relocation command received during step 108, the SRNC 20 then alters the physical channel configuration during step 110 to cause the corresponding radio access node 18 (see FIG. 1) to cease communication with mobile terminal user 16. Thereafter, the SRNC 20 forwards to the SGSN 22 an updated Source Radio Node Service (SRNS) context request during step 112 to reflect the dropping of service to the mobile terminal 16 from the radio access node 18. The SGSN 22 acknowledges receipt of the SRNS context during step 114.

Once the mobile terminal user 16 initiates access with the IWE 32 through its radio access point 30 (see FIG. 1), the user then initiates a physical radio channel configuration request during step 118 in order to select an appropriate radio channel to commence a communications session with the wireless LAN 14. In practice, the radio access point 30 will utilize certain radio channels as "calling channels" for making initial access. After establishing access, the mobile terminal user 16 and the radio access point 30 will utilize a different channel to conduct an extended communications session.

Once the mobile terminal user 16 has established access and has physically reconfigured (i.e., changed) the radio channel, the IWE 32 will detect during step 120 that the mobile terminal user 16 has successfully accessed the wireless LAN 14. Now in communication with the wireless LAN 14, the mobile terminal user 16 will no longer communicate with SRNC 20 through its radio access node 18 on the channel previously used for such communications. Thus, during step 122, the SRNC 20 will detect the absence of such communication corresponding to relocation of the mobile terminal user 16 to the wireless LAN 14 and will notify the SGSN 22 accordingly. Once the mobile terminal user 16 has ceased communicating with the radio access node 18 for more than a prescribed interval, then the SRNC 20 sends a message to the SGSN 22 during step 124 signaling completion of relocation. In response to the receipt of the signal from the SRNC 20 of completion of relocation, the SGSN 22 signals the SRNC 20 during step 126 to release the radio access node 18 (see FIG. 1) previously providing service to the mobile terminal user 16 via an Iu release command.

During step 128, the SRNC 20 issues a command to effect release of the Radio Resource Control (RRC) connection between the mobile terminal user 16 and the radio access node 18 of FIG. 1. Upon release of the connection, the SRNC 20 alerts the IWE 32 during step 130, and signals a release complete to the SGSN 22 during step 132. Thereafter, the SGSN 22 signals the mobile terminal user 16 of its acceptance of the routing area update during step 134, whereupon the SGSN 22 will update its internal files, as well as update the HLR 25 of FIG. 1. Upon receiving an acceptance of the routing area update request, the mobile terminal user 16 will indicate to the SGSN 22 completion of the routing area update request during step 136.

To effect a handoff back to the RNC 20 and its associated radio access node 18, the mobile terminal user 16 will make another routing area (RA) update request. A method similar to that described above would then be undertaken to relocate the mobile terminal user 16 from the IWE 32 and its associated radio access point 30 in the wireless LAN 14 to the RNC 20 and its associated radio access node 18 in the wireless telephony network 12. Upon relocation of the mobile terminal user 16 to the RNC 20 as the new SRNC, the SGSN 22 would again update its internal records as well as update the HLR 25.

RNC 20 Forced Handoff

The mobile terminal user 16 can also force a handoff from the SRNC 20 and its associated radio access node 18 by purposely manipulating the received signal strength reported to the wireless telephony network 12 in such a way that the IWE 32, through its associated access point 30 in the wireless LAN 14, appears to provides the user with a greater received signal strength. As discussed above, handoff of the mobile terminal user from the current SRNC 20 and its associated radio access node 18 to another SRNC and associated radio access node depends on the received signal strength. By purposely manipulating the received signal strength reported to the SRNC 20 via its associated radio access node 18, the mobile terminal user 16 can thus force a handoff.

In practice, the mobile terminal user 16, once having successfully initiated access with the wireless LAN 14, will then manipulate the received signal strength reported to all of the RNCs 20 via their associated radio access nodes 18 to indicate that the IWE 32, through its associated access point 30, provides a greater received signal strength. From such a report of greater received signal strength in the wireless LAN 14, the SRNC 20 has no other choice but to trigger relocation so that the data path to the mobile terminal user 16 will now go through the IWE 32 in the wireless LAN 14 as the logical SRNC in place of SRNC 20. The SRNC 20 triggers such relocation by sending a command to the SGSN 22, which in turn, effects relocation in the manner previously discussed with respect to FIG. 2.

After completing a communications session with the wireless LAN 14, the mobile terminal user 16 can initiate a communications session with the with one of RNCs 20 through its associated radio access node 18 in the wireless telephony network 12 by ceasing to manipulate the reported received signal strength. In this way, the mobile terminal user 16 now appears to the wireless telephony network 12 as it did prior to initiating access to the wireless LAN 14.

The foregoing describes techniques for enabling a mobile terminal user to force a seamless handoff from a first radio access mechanism (i.e., RNC 20 and its radio access node 18 in a wireless telephony network 12) to a second radio access mechanism (i.e., IWE 32 and access point 30 in a wireless LAN 14).

What is claimed is:

1. A method for effecting a seamless hand-off of a mobile terminal user in a communications network from a first radio access mechanism to a second radio access mechanism, comprising the steps of:

receiving in a communications network a forced hand-off request from a mobile terminal user in the form of one of a routing area (RA) update request or a manipulated reduced signal strength report to initiate a forced hand-off request to the second radio access mechanism;

triggering in the network a command to relocate (hand-off) the mobile terminal user to the second radio access mechanism from the first radio access mechanism in response to the forced hand-off request made by the mobile terminal user to relocate to the second radio access mechanism;

responsive to the command, assigning the mobile terminal user to the second radio access mechanism; and releasing the first radio access node from the mobile terminal user.

2. The method according to claim 1 wherein the step of triggering in the network the command to relocate the mobile terminal user comprises the step receiving at the second radio access mechanism the relocation request made by the user.

3. The method according to claim 1 wherein the step of triggering in the network the command to relocate the mobile terminal user comprises the step receiving at the first radio access mechanism the relocation request made by the user.

4. The method according to claim 1 wherein the step of assigning the mobile terminal user to the second radio access mechanism comprises the step of establishing a data path through a Radio Network Control means comprising part of the second radio access mechanism.

5. The method according to claim 4 wherein the step of assigning the mobile terminal user to the second radio access node comprises the step of physically configuring a radio channel for carrying communications between the mobile terminal user and a radio access node managed by the Radio Network Control means.

6. The method according to claim 1 further comprising the step of updating a stored record in the network to reflect relocation of the mobile terminal user from the first radio access mechanism to the second radio access mechanism.

7. The method according to claim 1 further including the steps of:

receiving in a communications network a forced hand-off request from a mobile terminal user in the form of one of a routing area (RA) update request or a manipulated reduced signal strength report to initiate a forced hand-off request to the first radio access mechanism;

triggering in the network a second command to relocate (hand-off) the mobile terminal user to the first radio access mechanism from the second radio access mechanism;

responsive to the second command, assigning the mobile terminal user to the first radio access mechanism; and releasing the second radio access mechanism from the mobile terminal user.

8. The method according to claim 7 wherein the step of assigning the mobile terminal user to the first radio access mechanism comprises the step of establishing a data path through a second Radio Network Control means comprising part of the first radio access mechanism.

9. The method according to claim 8 wherein the step of assigning the mobile terminal user to the first radio access node comprises the step of physically configuring a radio channel for carrying communications between the mobile terminal user and a second radio access node managed by the second Radio Network Control means.

10. The method according to claim 9 further comprising the step of updating a stored record in the network to reflect relocation of the mobile terminal user from the second radio access mechanism to the first radio access mechanism.

11. A system for effecting a seamless hand-off of a mobile terminal user in a communications network from a first radio access mechanism to a second radio access mechanism, comprising:

means for receiving in a communications network a forced hand-off request from a mobile terminal user in the form of one of a routing area (RA) update request or a manipulated reduced signal strength report to initiate a forced hand-off request to the second radio access mechanism;

means for triggering in the network a command to relocate (hand-off) the mobile terminal user to the second radio access mechanism from the first radio access node in response to a request made by the mobile terminal user to relocate to the second radio access mechanism;

means for assigning the mobile terminal user to the second radio access mechanism responsive to the command to relocate the mobile terminal user; and means for releasing the first radio access mechanism from the mobile terminal user.

12. The apparatus according to claim 11 wherein the first radio access mechanism comprises:

a radio access node in a wireless telephony network; and a Radio Network Controller for managing the radio access node in the wireless telephony network.

13. The apparatus according to claim 12 wherein the second radio access mechanism comprises:

a radio access point in a wireless Local Area Network (LAN); and an Interworking Element for managing the radio access point in the wireless LAN so as to appear as a logical Radio Network Controller.

14. The apparatus according to claim 13 wherein the means for triggering the relocation command comprises a Serving General Packet Radio Service Node (SGSN) in the wireless telephony network.

15. The apparatus according to claim 12 wherein the means for releasing the first radio access mechanism comprises the Radio Network Controller.

* * * * *